United States Patent [19]

Yasumatsu et al.

[11] 4,194,019
[45] Mar. 18, 1980

[54] PREPARATION OF AN ACIDIFIED MILK BEVERAGE

[75] Inventors: Mutsuo Yasumatsu; Kenji Katayama; Shozo Takeuchi; Yoshio Saito, all of Tokyo, Japan

[73] Assignee: Calpis Shokuhin Kogyo Kabushiki Kaisha, Tokyo, Japan

[21] Appl. No.: 934,910

[22] Filed: Aug. 18, 1978

Related U.S. Application Data

[63] Continuation of Ser. No. 782,396, Mar. 29, 1977, abandoned.

[30] Foreign Application Priority Data

Apr. 8, 1976 [JP] Japan ................................ 52-38776

[51] Int. Cl.² ............................ A23L 2/00; A23C 9/10
[52] U.S. Cl. ..................................... 426/580; 426/590; 426/522
[58] Field of Search ................. 426/583, 522, 580, 590

[56] References Cited

U.S. PATENT DOCUMENTS 3,800,052  3/1974  Inagami et al. ..................... 426/583

OTHER PUBLICATIONS

Webb, et al., Byproducts from Milk, 2nd Ed., The AVI. Pub. Co., Inc., Westport, Conn. 1970, (pp. 233, 234, 239–243, 263 & 264).

Primary Examiner—David M. Naff
Attorney, Agent, or Firm—Stevens, Davis, Miller & Mosher

[57] ABSTRACT

An acidified milk beverage which has milk protein stably dispersed therein and which is ready to drink without dilution is produced by subjecting an acidified skim milk having a milk solids-not-fat content of 0.5 to 3.5 w/w % and a pH value of 3.0 to 3.9 to a heating treatment at an ultra-high temperature in the range of 100° to 160° C.

3 Claims, No Drawings

PREPARATION OF AN ACIDIFIED MILK BEVERAGE

This is a continuation of application Ser. No. 782,396 filed Mar. 29, 1977, now abandoned.

BACKGROUND OF THE INVENTION

To date a variety of beverages using acidified milk using skim milk as the starting material have been studied and developed. Of these products, very few have been offered as the ready-to-drink type. On the other hand, products of acidified thick milk beverage with much sugar which are diluted with water or carbonated water prior to drink have been consumed widely. Owing to excessively high sugar contents, however, these products suffers from the disadvantage that they must be diluted each time they are consumed. Furthermore, the solutions prepared by diluting said products are intended to be immediately consumed and, therefore, have another disadvantage that they readily produce a precipitate when they are left to stand for a long period. Even if the conventional acidified thick milk beverages are simply diluted, the resultant diluted solutions are unmarketable as beverages of the ready-to-drink type because of the interval between the time they are prepared and the time they are consumed by individual users. This is because the products in their thick state have so high sugar contents that high viscosities of the products prevent milk protein particles from precipitating but, once diluted, they can no longer be expected to provide said effects and specific gravity of sugar content. Thus, the milk protein particles settle down to form a precipitate because of the force of gravity.

In an effort to develop beverages of the ready-to-drink type, various attempts have so far been made at devising proper means for addition of acids, elucidating the relation between the concentrations of acids and the milk solids-not-fat contents, incorporating proper use of proteases and ensuring the stability of beverage constitution by heating. Commercial-scale production of beverages which possess tasty flavor and, at the same time, provide thorough stability of milk protein dispersion is so difficult that very few beverages have had favorable growth as really marketable products. For example, the stabilization of beverage constituent by heating has been disclosed in U.S. Pat. No. 3,800,052 owned by Calpis Shokuhin Kogyo Kabushiki Kaisha. As concretely disclosed in experiments and examples of said prior art, the heating is carried out at temperatures not exceeding 100° C. U.S. Pat. No. 3,800,052, furthermore, has a restriction that sugar must be added prior to the incorporation of an acid to produce a thoroughly stable beverage.

In addition to those methods enumerated above, methods resorting to addition of thickeners and stabilizers have been studied. Having ascertained that such additives impair the beverage flavor and, when left to stand in the acidified condition for a long period, tend to degrade themselves and further that use of these additives frequently pose a serious issue relating to spoilage of natural food and hygienic valuation of food, the inventors have avoided using these additives in the development of products.

As already stated, the inventors have carefully reviewed the conventional techniques and have made an intense study in search of a method simple to perform and yet highly effective. The inventors have consequently succeeded in improving the art of U.S. Pat. No. 3,800,052. To be specific, the inventors have found that a heat treatment given at temperatures exceeding 100° C. to an acidified milk under specific conditions described afterward without having to add any sugar prior to incorporation of an acid is notably effective in stabilizing the dispersion of milk protein and that said treatment yields a product of good taste.

SUMMARY OF THE INVENTION

This invention relates to a method for the production, from skim milk as the raw material, of an acidified milk beverage which has milk proteins stably dispersed therein for a long time without relying on incorporation of a thickener or a colloid-dispersion stabilizer, possesses tasty flavor and is ready to drink without being diluted with water or carbonated water. The invention also relates to the acidified milk beverage thus produced.

DETAILED DESCRIPTION OF THE INVENTION

The present invention is based on the above finding and relates to a method which comprises preparing an acidified milk from skim milk by adjusting a milk solids-not-fat content and the pH of said skim milk and thereafter subjecting the acidified milk to an ultra-high temperature heating treatment at temperatures exceeding 100° C. The salient feature of this invention resides in giving to the acidified milk the ultrahigh temperature heating treatment at temperatures exceeding 100° C.

The term "acidified milk beverage" of the ready-to-drink type as used in this invention refers to the type possessing such a degree of sweetness as to suit immediate consumption and the type containing no sweetening. In the case of the latter type, the acidified milk beverage may be consumed with sweetening according to one's taste.

The term "skim milk" as used in the present invention refers to ordinary skim milk obtained by skimming cow's milk, condensed skim milk, sugar-added condensed skim milk, powdery skim milk and sugar-added powdery skim milk. These various skim milks may be used alone or in the form of suitable mixtures.

The method of this invention starts with preparation of an acidified milk (aqueous solution) from said skim milk. The acidified milk is prepared by lactic acid fermentation, acid addition, further addition of an acid to the milk acidified by lactic acid fermentation, or suitable combination thereof. Any type of edible acids may be used for this invention for example, lactic acid, citric acid, malic acid, tartaric acid and phosphoric acid. By said lactic acid fermentation, acid addition or suitable combination thereof, the pH value of the skim milk is adjusted to the range of 3.0 to 3.9, preferably to the range of 3.35 to 3.75. Besides the use of an acid, the adjustment of the pH value may suitably be effected by use of an alkali agent capable of heightening the pH value when it is too low, by addition of water, by treatment using an ion-exchange resin or even by addition of skim milk in an amount not so large as to increase the milk solids-not-fat content tolerated by this invention. The sequence in which the adjustment of the pH value and the adjustment of the milk solids-not-fat content take place is not critical. The two adjustments may be carried out simultaneously. When there is used an acidified milk such as a milk acidified by lactic acid fermentation which is observed to entail coagulation of milk protein, the method of this invention can effectively be carried out by having the acidified milk subjected to the ordinary homogenizing treatment prior to the ultra-high temperature heating treatment.

The milk solids-not-fat content is adjusted to the range of 0.5 to 3.5 w/w%, preferably to the range of 0.7 to 1.5 w/w%. The term "milk solids-not-fat content" as used in the present invention refers to what originates in raw milk. The acidified milk may have its milk solids-not-fat content adjusted in advance to a level below 3.5 w/w%. Otherwise an acidified thick milk may be diluted so that said content will fall into the specified range. The adjustment of the milk solids-not-fat content may suitably be effected by controlling the amount of skim milk, the amount of water, the amount of sugar or the amount of an acid solution, for example.

As described above, the skim milk has its pH value and milk solids-not-fat content adjusted prior to the ultra-high temperature heating treatment. When the pH value is below 3.0, the resultant beverage becomes strongly acidic and gives off light flavor in spite of high stability of milk protein dispersion. Thus, the beverage has an acidic taste stand out. Such defective taste results also when the milk solids-not-fat content is kept below 0.5 w/w%. When the pH value exceeds 3.9 or when the milk solids-not-fat content exceeds 3.5 w/w%, the stability of milk protein dispersion is degraded and the refreshing taste is likewise degraded. Under such conditions, the effect of the present invention can not be expected.

The acidified milk which has been obtained by adjusting the milk solids-not-fat content to the range of 0.5 to 3.5 w/w% and the pH value to the range of 3.0 to 3.9 is subsequently heated at temperatures in the range of 100° to 160° C., preferably in the range of 125° to 160° C. If in this treatment, the temperatures are below 100° C., then the stability of milk protein dispersion is inferior to that obtained at temperatures exceeding 100° C. When two beverages having one equal milk solids-not-fat content and pH value are produced, the one beverage obtained at temperatures exceeding 100° C. excels the other beverage obtained at temperatures below 100° C. in terms of stability. In other words, the beverage produced by the method of this invention can exhibit a higher milk solids-not-fat content or assumes a pH value closer toward the isoelectric point (the closeness being in proportion to decrease of acidic taste) than the beverage produced by the heating for stabilization at temperatures below 100° C. If the heating is given at temperatures exceeding 160° C., the resultant acidified milk beverage loses its peculiar taste or emits an odor originating in the heating. Further, such as ultra-high temperature heating renders the operation uneconomical.

The ultrahigh temperature heating treatment mentioned above will be described in further detail. The stability of the milk protein dispersion in the acidified milk treated increases as the temperature of heating rises from the level of 100° C. In the prior art for the production of acidified milk beverages of this type, the highest temperature at which the heat treatment is performed for the stabilization of the beverage constitution is only 85° C. Even in the heating for the purpose of sterilization, the highest temperature known does not exceed 100° C. The temperature of 100° C. itself is not included in the temperature ranges claimed in the present invention. In any event; the widely accepted theory that milk, upon exposure to heating at high temperatures, tends to undergo coagulation has long induced many to believe that in the case of an acidified milk beverage, application of heat at temperatures exceeding 100° C. rather degrade the dispersion of milk protein. The ultra-high temperature heating treatment by the present invention need not be given for a long time of the order of tens of minutes but may effectively be given for not more than ten seconds. Therefore, the possiblity of the ultra-high temperature heating treatment impairing the flavor of the resultant beverage is rather less than when the ordinary heating treatment is carried out at temperatures below 100° C. The ultra-high temperature heating at temperatures exceeding 100° C. can easily be effected by heating under an increased pressure or by heat exchange using steam, for example.

The numerical limitation of the essential elements of this invention has been fixed by taking into due consideration the stability of the milk protein dispersion primarily aimed at by this invention and the favorable flavor. What is more, it has also been taken into account that with the combination of the preferred numerical conditions (0.7 to 1.5 w/w% of milk solids-not-fat content, pH 3.35 to 3.75 and 125° to 160° C. of heating temperature), the whiteness and stability of the resultant beverage increase in proportion as the heating temperature increase as shown in undermentioned Experiment 3.

As to the addition of sugar, although the present invention does not necessarily require the addition of sugar, the effect of the invention is not prevented by the addition of sugar in an amount to give a sweet taste properly. In the production of a beverage having a sugar content suited to immediate consumption, it is advantageous to add 8 to 13 w/w% of sugar, preferably 12 w/w%, before or after the ultra-high temperature heating treatment. The addition of sugar may be effected at any desired step in the whole course of production. It may be incorporated in the skim milk preparatorily to the treatment by this invention or may be added after the ultra-high temperature heating treatment. In any event, the purpose of the addition of sugar is satisfied in sofar as the sugar is added in an amount to give a proper sweetness to the finally produced acidified milk beverage ready to drink. Sweetenings including spears such as sucrose, glucose and fructose and artificial sweetenings such as saccharine and sodium cyclamate as well as flavorings may be added by the method heretofore practiced in the art. After the ultra-high temperature heating treatment, water and various additives besides said sweetenings and flavorings may be suitably added to accomplish this invention insofar as the addition does not impair the object of the invention. In one preferred embodiment of this invention, a sugar and a flavoring are incorporated in the acidified milk prior to the ultra-high temperature heating treatment and, subsequent to said treatment, the liquid is withdrawn from the heating system when the temperature has fallen to 85° C. and immediately packed in hermetically sealed containers. This embodiment proves highly advantageous because the packed beverage is no longer required to be heated again for the purpose of sterilization. If, after the ultra-high temperature heating treatment, the temperature of the liquid is suffered to fall because of the standing permitted for the purpose of removal of foreign substances or microbes, sealing of carbon dioxide or addition of sugar, for example, then the liquid may be sterilized by an ordinary heating at temperatures below 100° C. or it may suitably be subjected to a known treatment such as, for example, addition of an antimicrobial additive and, thereafter, packed in hermetically sealed containers for marketing.

Thus, an acidified milk beverage ready-to-drink which can be consumed in its unmodified form without further incorporation therein of a thickener or stabilizer can be produced by an extremely simple method of the present invention and it has tasty flavor and stable milk protein dispersion for a long time.

Now the present invention will be described concretely with reference to the following experiments and examples.

EXPERIMENT 1

Skim milk prepared by skimming cow's milk was pasteurized by heating at 90° C. for 15 seconds and then cooled. To the milk was added 3 w/w% of a starter obtained by preculturing *Lactobacillus bulgaricus*. The milk was allowed to undergo lactic acid fermentation at 37° C. to produce a milk having a pH value of 3.50 acidified by lactic acid fermentation. This fermented milk was homogenized under 150 kg/cm$^2$ and divided into 20 aliquots each of 30 kg in weight. To each aliquot of the milk were added water and 10 w/w% aqueous solution of sodium citrate to produce an acidified milk having 2 w/w% of milk solids-not-fat content invariably and a pH value of either 3.72 or 3.83. The acidified milk thus prepared was subjected to a heating treatment in a tubular type heat exchanger at a varying temperature between 80° and 160° C. for about 5 seconds, withdrawn at 80° C. through the heat exchanger, immediately packed hot in colorless transparent hermetically sealed bottles of 200 ml in volume and cooled rapidly to room temperature. After the cooling, the acidified milk beverages were stored at room temperature. The beverages were analyzed for stability of milk protein dispersion after 7 days and 30 days of standing. The results are shown in Table 1. The data shown in the table represent high values of pH (weakly acidic side) in the limited pH range of the present invention. Lower values of pH (strongly acidic side) imply improved stability of milk protein dispersion as a matter of course. From the results, the outstanding effect of this invention is evident.

Table 1

| Heating temperature (°C.) | After 7 days' standing | | After 30 days' standing | |
|---|---|---|---|---|
| | pH 3.72 | pH 3.83 | pH 3.72 | pH 3.83 |
| 80 | * | * | * | * |
| 90 | +++ | ++++ | * | * |
| 100 | ++ | ++ | +++ | +++ |
| 110 | − | + | + | ++ |
| 120 | − | − | + | + |
| 125 | − | − | − | + |
| 130 | − | − | − | − |
| 140 | − | − | − | − |
| 150 | − | − | − | − |
| 160 | − | − | − | − |

(Note):
The stability was rated by the scale, wherein:
*Extremely heavy precipitation of milk protein and clear liquid
++++ Heavy precipitation of milk protein
++ Slightly conspicuous precipitation of milk protein
+ Slight precipitation of milk protein
− Absolutely no or substantially negligible precipitation of milk protein

EXPERIMENT 2

By following the procedure of Example 1, there were prepared 16 aliquots each of 30 kg of milk acidified by lactic acid fermentation and having a pH value of 3.60 invariably. Each aliquot of milk has its milk solids-not-fat content and pH value adjusted as indicated in Table 2 by using water, 10 w/w% aqueous solution of sodium citrate and 20 w/w% aqueous solution of lactic acid. Thus were obtained 16 kinds of acidified milk. By means of a tubular type heat exchanger, each acidified milk was subjected to an ultra-high temperature heating treatment at 140° C. for about five seconds. It was withdrawn at 80° C. from said heat exchanger, immediately packed hot in colorless transparent hermetically sealed bottles each of 200 ml in volume and quickly cooled to room temperature. The resultant acidified milk beverages were stored at room temperature and, after 30 days' standing, analyzed for stability of milk protein dispersion. The results are shown in Table 2.

Table 2

| SNF (W/W%) | pH 3.50 | pH 3.80 |
|---|---|---|
| 8.5 | * | * |
| 4.5 | +++ | ++++ |
| 3.5 | + | ++ |
| 2.5 | + | + |
| 1.5 | − | − |
| 1.0 | − | − |
| 0.8 | − | − |
| 0.5 | − | − |

(Note):
SNF = Milk solids-not-fat content
The stability (evaluated in terms of the amount of milk protein precipitate) was rated by the scale, wherein:
*Extremely heavy precipitation of milk protein and clear liquid
++++ Conspicuously heavy precipitation of milk protein
+++ Heavy precipitation of milk protein
++ Slightly conspicuous precipitation of milk protein
+ Slight precipitation of milk protein
− Absolutely no or substantially negligible precipitation of milk protein The beverages of Experiment 1 having a milk solids-not-fat content of 2.0 w/w% and heated at temperatures of 80° C. and 90° C. show extremely heavy degrees of precipitation, whereas the beverage shown in Table 2 of Experiment 2 having a milk solids-not-fat content of 3.5 w/w% is found to have high stability. The data clearly indicate that the present invention permits the stability to be highly improved.

EXPERIMENT 3

By adding water and an aqueous 50 w/w% citric acid solution to powdery skim milk, there was prepared an acidified milk having a milk solids-not-fat content of 1.07 w/w% and a pH value of 3.68. This acidified milk was divided into six aliquots each of 50 kg in weight. Each aliquot of milk was heated at a varying temperature in the range of 90° to 160° C. for about five seconds by passage through a tubular type heat exchanger. It was withdrawn at 85° C. from the heat exchanger. A sterilized sucrose separately heated to 80° C. was quickly added to each aliquot in an amount corresponding to 10 w/w%. The resultant liquid was immediately packed in colorless transparent hermetically sealed bottles each of 200 ml in volume and quickly cooled to room temperature to produce acidified milk beverages. After three months' standing at room temperature, the beverages were analyzed for stability of milk protein dispersion and whiteness. The results are shown in Table 3. As is clearly indicated in Table 3, the stability is increased and the whiteness is improved in proportion as the heating temperature rises. It is also seen that particularly at temperatures not less than 125° C., such effects are quite conspicuous.

Table 3

| Treating temperature (°C.) | Whiteness | Precipitation |
| --- | --- | --- |
| 90 | (−) | ++++ |
| 100 | (−) | ++ |
| 120 | (+) | + |
| 125 | (++) | − |
| 140 | (+++) | − |
| 160 | (++++) | − |

(Note):
The stability (evaluated in terms of the amount of milk protein precipitated) was rated by the scale, wherein:
++++Conspicuously heavy precipitation of milk protein
+++Heavy precipitation of milk protein
++Slightly conspicuous precipitation of milk protein
+Slight precipitation of milk protein
−Absolutely no or substantially negligible precipitation of milk protein The whiteness was rated on the five-grade scale, wherein:
(−)Substantially colorless, transparent liquid
(+) Slightly white, transparent liquid
(++)Fairly white, translucent liquid
(+++)Appreciably white, opaque liquid
(++++)Notably white, opaque liquid

EXAMPLE 1

Skim milk having a milk solids-not-fat content of 8.5 w/w% prepared by skimming cow's milk was pasteurized at 90° C. for 15 seconds. Thereafter, the pasteurized skim milk was quickly cooled to 37° C. Then, to the milk was added 3 w/w% of a starter of Lactobacillus bulgaricus. The milk was left to undergo fermentation at 37° C. for 20 hours, to prepare a milk acidified by lactic acid fermentation having a pH value of 3.45. A mixture of 21 kg of this acidified milk and 18.3 kg of sucrose has homogenized under 140 kg/cm² and then mixed with 135 kg of water and 120 g of lemon flavor. The resultant mixed solution had its pH value adjusted to 3.72 by addition of 10 w/w% aqueous solution of sodium citrate. The solution was then subjected to an ultra-high temperature heating treatment at 145° C. for about seven seconds by passage through a tubular type heat exchanger. It was withdrawn at 80° C. from said heat exchanger and immediately hot packed in brown transluent hermetically sealed bottles each of 200 ml in volume and quickly cooled to room temperature to produce an acidified milk beverage. After six months' standing at room temperature, the beverage still retained its excellent flavor and showed highly stable milk protein dispersion.

EXAMPLE 2

An acidified milk beverage was produced by following the procedure of Example 1 except that there was used water in place of 18.3 kg of sucrose. This beverage obtained had a stable milk protein dispersion and excellent flavor.

What is claimed is:

1. A method for the production of a stabilized acidified milk beverage, which consists essentially of
   preparing an acidified milk having a milk solids-not-fat content of 0.7 to 1.5 w/w% and a pH value of 3.35 to 3.75 from skim milk and subsequently
   subjecting the acidified milk to an ultra-high temperature heating treatment at temperatures in the range of 125° to 160° C. for not more than ten seconds, said process being carried out in the absence of added sugar prior to said ultra-high temperature heating.

2. The method of claim 1 wherein sugar is added to said acidified milk after said ultra-high temperature heating in an amount to give a sweet taste for immediate consumption to the resulting stabilized acidified milk beverage.

3. The method of claim 9 wherein sugar is added in an amount of about 8 to 13 w/w%.

* * * * *

UNITED STATES PATENT AND TRADEMARK OFFICE
CERTIFICATE OF CORRECTION

PATENT NO. : 4,194,019
DATED      : March 18, 1980
INVENTOR(S) : YASUMATSU ET AL.

It is certified that error appears in the above-identified patent and that said Letters Patent are hereby corrected as shown below:

Column 1, line 22, change "wheh" to -- when --.
Column 4, line 7, change "possiblity" to -- possibility --.
Column 4, line 44, change "spears" to -- sugars --.
Column 8, line 4, change "transluent" to -- translucent --.
Column 8, line 34, change "claim 9" to -- claim 2 --.

Signed and Sealed this

Fifth Day of August 1980

[SEAL]

Attest:

SIDNEY A. DIAMOND

*Attesting Officer*  *Commissioner of Patents and Trademarks*